Oct. 5, 1965     P. W. HARLAND     3,209,595
COMBINED TEMPERATURE AND PRESSURE SENSING APPARATUS
Filed July 18, 1961
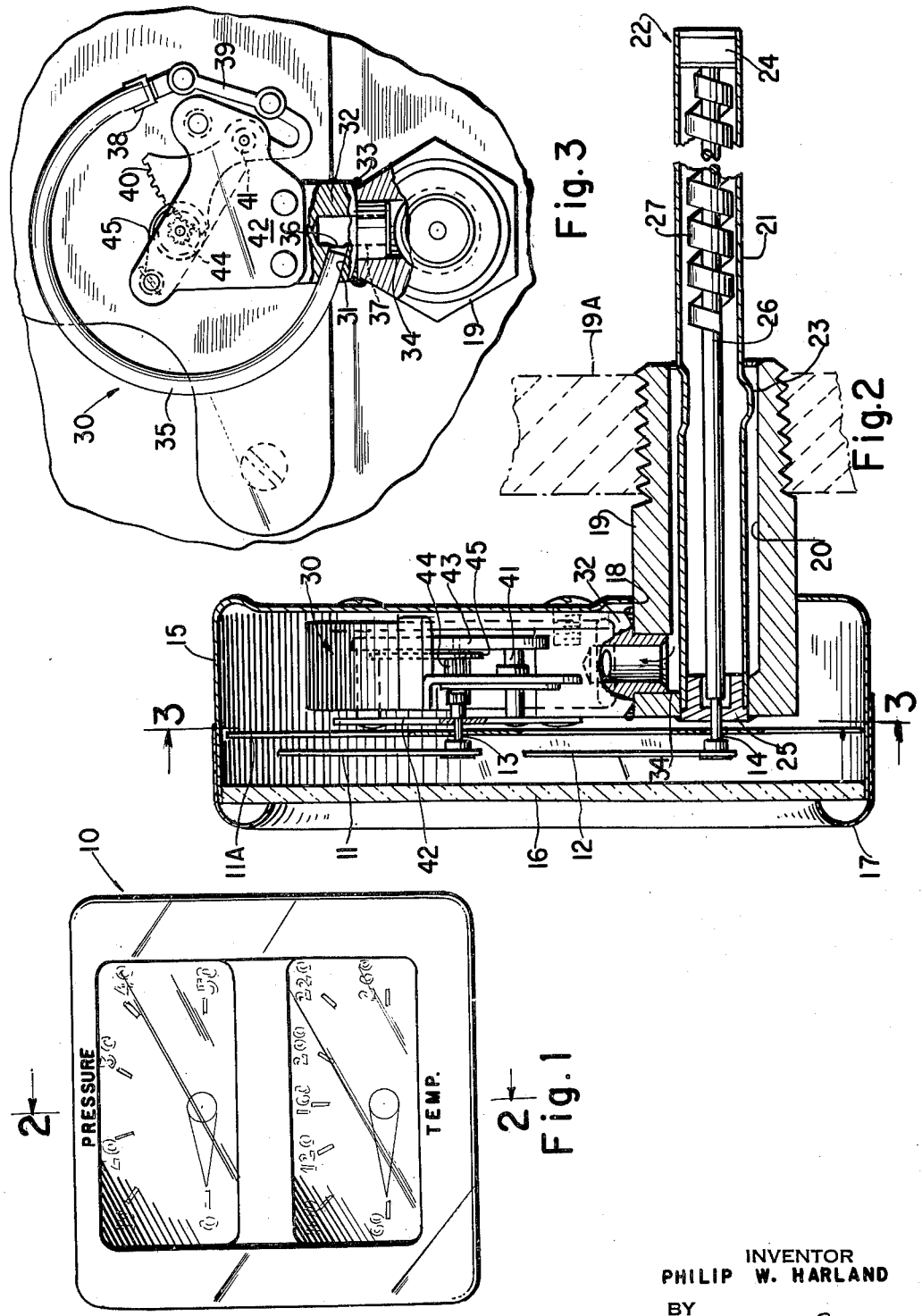
INVENTOR
PHILIP W. HARLAND
BY
*Robertson & Smythe*
ATTORNEYS United States Patent Office 3,209,595
Patented Oct. 5, 1965

3,209,595
COMBINED TEMPERATURE AND PRESSURE
SENSING APPARATUS
Philip W. Harland, Sellersville, Pa., assignor to Ametek,
Inc., a corporation of Delaware
Filed July 18, 1961, Ser. No. 124,915
2 Claims. (Cl. 73—345)

This invention relates to measuring instruments and more particularly to a gauge for measuring and indicating more than one condition.

In obtaining a plurality of distinct condition measurements, such as the temperature and pressure of the fluid in a domestic boiler, it has been the general practice to either employ separate gauges or gauge units having separate connections with the chamber containing the measured fluid. It is apparent that individual connections of this sort often require duplication of labor and materials in cases of original installation of the gauge connections as well as upon their removal for repair.

It is an object of this invention to provide a combination gauge construction that simultaneously indicates a plurality of distinct fluid condition measurements while requiring but one connection to the fluid chamber.

Another object of this invention is to provide a combination gauge construction that requires but a single connection with a chamber in which a measured fluid is stored and indicates both the pressure and the temperature conditions of the fluid.

A further object of the invention is to provide a combination gauge construction which permits the use of standard pressure gauge parts.

Another object of the invention is to provide a combination gauge construction wherein the parts may be easily assembled.

A still further object of the invention is to provide a combination gauge construction having a primary socket having concentric holes to facilitate the machining operations in forming a passage to receive a condition measuring means.

In one aspect of the invention, the combination gauge includes a primary socket having a passage therein, the passage being adapted to be placed in communication with the fluid of a boiler when the gauge is connected to the boiler. The primary socket has a first condition measuring means, such as a thermal responsive element, extending therethrough. An auxiliary socket is provided having a passage communicating with the passage of the primary socket and carrying a second condition measuring means, such as a pressure responsive element, in communication with the socket passages.

The foregoing and other objects, features and advantages will become apparent from the following description and drawings which are merely exemplary.

In the drawings:

FIG. 1 is a front elevational view of a preferred gauge unit embodying the principles of the present invention;

FIG. 2 is a sectional view taken substantially along lines 2—2 of FIG. 1 in the direction of the arrows; and FIG. 3 is a partial front sectional view of the gauge unit taken substantially along lines 3—3 of FIG. 2 in the direction of the arrows.

The preferred form of combination gauge unit, generally shown at 10 in FIG. 1, has particular use as a boiler gauge in a domestic hot water heating system, or the like, for simultaneously indicating or measuring pressure and temperature conditions of fluid within a boiler chamber to which it has a single connection. However, the gauge may be employed to measure similar conditions of fluids other than boiler water, and other types of measurement may be performed.

Mounted for pivotal movement in front of a pressure graduated portion of dial 11A is a pressure indicator or pointer 11. A pivotally mounted temperature indicator or pointer 12 is similarly positioned in front of a temperature graduated portion of the scale. The indicators 11, 12, are connected to rotary shaft connectors 13, 14 (FIG. 2) of pinion gear 44 and shaft 26, respectively, within the confines of the steel casing 15 and the glass plate 16 secured thereto by steel ring 17 in any desired conventional manner.

Mounted in an opening 18 in the rear wall of the casing 15 is a primary socket 19, the rear end of which may be threaded for connection to a boiler or chamber that contains the fluid to be measured.

The primary socket 19 has a longitudinally extending cylindrical passage 20 which may be reduced at its front end to receive and have rigidly connected thereto, as by soldering, the front end of an elongate cylindrical sleeve 21 of a bi-metal thermometer 22. The sleeve 21 is of smaller cross-section than the passage 20 to provide a predetermined clearance about the sleeve within a substantial length of the passage. The sleeve is preferably swaged to provide external protuberance portions or supporting surfaces 23 adjacent the rear of the passage so that the sleeve may be positioned substantially concentrically relative to the passage. Bushings 24, 25 are provided at the ends of the sleeve which are adapted to seal the same from penetration by the fluid in which the thermometer may be immersed. The shaft 26 may be journalled or centrally supported within the sleeve by the bushings, and is connected to the pointer 12. The bi-metal element 27 is connected to the stationary bushing 24 and to an intermediate surface on the shaft 26. Expansion and contraction of the bi-metal element 27 when the sleeve is immersed in a fluid will cause rotary movements of the shaft 26 and pointer 12, thereby indicating on the temperature scale the temperature of the fluid in the boiler.

A Bourdon tube arrangement 30 (FIG. 3) may be solder connected to a slot 31 in an auxiliary socket 32 which in turn is soldered as at 33 to the primary socket 19 adjacent a transverse bore 34 therein intersecting the passage 20. The open end of the Bourdon tube 35 is in communication with the bore 34 of the primary socket through openings 36 and 37 in the lower part of the auxiliary socket. All of the socket solder connections may be performed simultaneously at one location. The parts are held in assembled relation and then heated and soldering flux is applied to the areas to be soldered together with the solder.

When the primary socket 19 is connected to a wall schematically shown at 19A of a boiler with the thermometer 22 immersed in the fluid thereof, pressure within the boiler will be transmitted through bore 34 and the aforementioned clearance about the thermal sleeve 21, and thence the open end of the Bourdon tube 35 through bores 36 and 37 of auxiliary socket 32. Subsequent increases and decreases in pressure exerted on the Bourdon tube will cause respective outward and inward deflection of the tip 38 at the free end of the tube 35, deflections of the tip being transferred in the usual manner by link 39 into pivotal movements of the sector 40 which is pivotally mounted on an arbor 41 extending between front and rear movement plates 42, 43. At least one of the movement plates is preferably secured or otherwise rigidly connected to the auxiliary socket, and the plates 42, 43 are connected to prevent relative movement thereof. The teeth of the secor or segment 40 engage the teeth of the pinion gear 44 to rotate the latter in response to pivotal movements of gear sector. Pinion gear 44 may be biased toward a normal position in a torsional manner by hairspring 45. By means of the foregoing movement, pressure variations of the measured fluid will impart rotary movements to the pinion gear 44 and the pointer 11 connected for unitary movement therewith by shaft extension 13 passing or extending through the front movement plate 42 and dial 11A. The pressure or altitude of the fluid within the boiler will thus be indicated by the rotary position of the pointer 11 relative to the pressure graduated portion of the dial or scale 11A which is located immediately rearward thereof.

It is to be understood that the described exemplary embodiment is merely intended for the purpose of illustration, and that the principles of the invention are not intended to be limited thereto, except as defined in the appended claims.

What is claimed is:

1. In a combination gauge including a housing having a rear wall, side walls and a viewing face adapted to be connected to a boiler and the like, the combination comprising a primary socket, said socket mounted in said rear wall and extending rearwardly therefrom, said primary socket having a longitudinal passage therein adapted to be placed in communication with fluid of a boiler, a transverse passage at one end of said socket communicating with said first passage, an auxiliary socket arranged in said transverse passage and having a passage therein communicating with said first passage, Bourdon tube means carried by said auxiliary socket and being angularly disposed relative to said primary socket, movement means mounted on said auxiliary socket, means connecting said tube and movement means, and thermal responsive means extending through said primary socket and having indicating means connected directly thereto.

2. In a combination gauge adapted to be connected to a boiler and the like, the combination comprising a primary socket having a longitudinal passage therein adapted to be placed in communication with fluid of a boiler, a transverse passage at one end of said primary socket communicating with said longitudinal passage, an auxiliary socket arranged in said transverse passage and communicating with said longitudinal passage, pressure responsive means carried by said auxiliary socket, and thermal responsive means extending longitudinally through said primary socket and adapted to be immersed in said fluid, said thermal responsive means being angularly disposed relative to said pressure responsive means, said thermal responsive means including a rotatable shaft and reduced extension thereof and having indicating means and an external cylindrical sleeve, said indicating means being connected directly to said reduced shaft extension of said thermal responsive means, said sleeve having an external protuberance for concentrically supporting said thermal responsive means in said passage adjacent the rear portion of said primary socket, said rotatable shaft and reduced extension being concentrically located relative to a front portion of said primary socket passage, said auxiliary socket and the front portion of said sleeve being connected to said primary socket, said pressure responsive means including a Bourdon tube connected to said auxiliary socket, front and rear movement plates secured to said auxiliary, socket movement means pivotally supported between said plates and connected to said Bourdon tube, a dial mounted on said front movement plate, pinion means rotatably driven by said movement means and having a shaft extending through said front movement plate and dial, and a pointer secured to said shaft and extending in front of said dial.

References Cited by the Examiner

UNITED STATES PATENTS

| | | | |
|---|---|---|---|
| 2,176,263 | 10/39 | Klein | 73—345 |
| 2,239,221 | 4/41 | Dunmock | 73—345 |
| 2,266,277 | 12/41 | Seegers et al. | 73—345 |
| 2,343,372 | 3/44 | Ford et al. | 73—363.9 |
| 2,365,962 | 12/44 | Kahn | 73—345 |
| 2,518,128 | 8/50 | Dufilho | 33—161 |
| 2,727,389 | 12/55 | Rose et al. | 73—345 |
| 2,947,557 | 8/60 | Schwab et al. | |

FOREIGN PATENTS

| | | |
|---|---|---|
| 259,312 | 4/13 | Germany. |
| 722,063 | 5/42 | Germany. |
| 129,808 | 7/19 | Great Britain. |

ISAAC LISANN, *Primary Examiner.*